(12) United States Patent
Utley

(10) Patent No.: US 7,290,071 B2
(45) Date of Patent: Oct. 30, 2007

(54) PROCESSOR WITH INPUT DATA BLOCK DISCARD MECHANISM FOR USE IN AN OVERSUBSCRIPTION CONDITION

(75) Inventor: Robert H. Utley, Round Rock, TX (US)

(73) Assignee: Agere Systems Inc., Allentown, PA (US)

( * ) Notice: Subject to any disclaimer, the term of this patent is extended or adjusted under 35 U.S.C. 154(b) by 526 days.

(21) Appl. No.: 10/675,716

(22) Filed: Sep. 30, 2003

(65) Prior Publication Data

US 2005/0071528 A1    Mar. 31, 2005

(51) Int. Cl.
 *G06F 3/00* (2006.01)
 *H04L 12/56* (2006.01)
(52) U.S. Cl. .......................... 710/52; 710/1; 370/412; 370/429
(58) Field of Classification Search ..................... None
 See application file for complete search history.

(56) References Cited

U.S. PATENT DOCUMENTS

| | | | |
|---|---|---|---|
| 5,764,641 A * | 6/1998 | Lin | 370/412 |
| 6,434,115 B1 * | 8/2002 | Schwartz et al. | 370/235 |
| 6,874,026 B2 * | 3/2005 | Maria et al. | 709/225 |
| 2001/0048662 A1 * | 12/2001 | Suzuki et al. | 370/230 |
| 2002/0176424 A1 * | 11/2002 | Knight et al. | 370/395.4 |
| 2003/0172149 A1 * | 9/2003 | Edsall et al. | 709/224 |
| 2003/0202481 A1 * | 10/2003 | Pillar et al. | 370/252 |

OTHER PUBLICATIONS

IEEE Journal on selected areas in communications, vol. 13, No. 4 (May 1995), pp. 633-641. "Dynamics of TCP Traffic over ATM Networks" by Allyn Romanow and Sally Floyd.*
U.S. Appl. No. 10/029,704, filed Dec. 21, 2001, M. Calle et al., "Processer with Packet Data Flushing Feature."
IBM PowerNP™, NP4GS3, Network Processor, pp. 1-12, 35-38 and 140-150, Jan. 2003.

* cited by examiner

*Primary Examiner*—Alford Kindred
*Assistant Examiner*—Richard Franklin

(57) ABSTRACT

A processor includes a plurality of input ports, memory circuitry for storing data blocks associated with protocol data units (PDUs) and received by the processor at the input ports, and controller circuitry coupled to the memory circuitry. The controller circuitry is operative to discard certain ones of the data blocks received at the input ports in an oversubscription condition in which the received data blocks exceed a designated capacity of the processor. A discarded data block indicator is generated for a given one of the input ports if a data block received at the given input port for a particular PDU is discarded. One or more additional data blocks received at the given input port for the particular PDU are discarded based at least in part on the discarded data block indicator. The oversubscription condition may thereby be overcome in a manner which advantageously minimizes the number of received PDUs that are corrupted through discarded data blocks.

19 Claims, 2 Drawing Sheets

PROCESSOR WITH INPUT DATA BLOCK DISCARD MECHANISM FOR USE IN AN OVERSUBSCRIPTION CONDITION

FIELD OF THE INVENTION

The present invention relates generally to data communication devices and systems, and more particularly to network processors or other types of processors utilizable in conjunction with processing operations, such as routing or switching, performed on packets or other protocol data units (PDUs).

BACKGROUND OF THE INVENTION

A network processor generally controls the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards. Packets in the routing and switching context are also commonly referred to as PDUs, and are typically variable in size, comprised of multiple data blocks.

A problem that can arise in a conventional network processor relates to oversubscription of the processor input ports. An oversubscription condition occurs when the input data traffic arriving at the input ports exceeds the total data bandwidth processing capability of the network processor. Typically, network processors are designed for a certain amount of oversubscription, since designing the processors to accommodate the worst-case maximum or peak data traffic that might be received at any given point in time can unduly increase processor size, complexity, power consumption and cost.

As a simple example of an oversubscription condition, assume that a conventional network processor is designed to accommodate at most the simultaneous reception of four 100-block PDUs over a set of five input ports. It is possible that data bursting may result in a peak traffic situation in which 100-block PDUs are received simultaneously at each of the five input ports, such that the sum of the received data traffic over the five input ports represents 125% of the total data bandwidth that can be handled by the processor.

Generally, a conventional network processor deals with this type of oversubscription condition by randomly discarding data blocks as they are received at the input ports. This is problematic in that any PDU for which one or more data blocks are discarded is considered corrupted. With reference to the above example processor designed to accommodate simultaneous reception of four 100-block PDUs over a set of five input ports, random discarding of data blocks in conjunction with the peak traffic situation in which five 100-block PDUs are received will likely result in each of the five received PDUs discarding at least one data block and thus being considered corrupted.

Oversubscription can therefore result in the discarding of data blocks for an excessively large number of PDUs, with the resulting corrupted PDUs wasting network processor resources and limiting processor throughput and performance.

As indicated previously, reducing the number of discarded data blocks by designing the processor to handle peak traffic situations may be impractical due to the corresponding increases in processor size, complexity, power consumption and cost.

Accordingly, a need exists for an improved technique for dealing with oversubscription of input ports in a network processor.

SUMMARY OF THE INVENTION

The invention provides an input data block discard mechanism for dealing with oversubscription of input ports in a network processor or other type of processor, in a manner that eliminates the need for random discarding of data blocks and thereby substantially reduces the number of PDUs for which data blocks are discarded.

In accordance with one aspect of the invention, a network processor or other type of processor includes a plurality of input ports, memory circuitry for storing data blocks associated with PDUs and received by the processor at the input ports, and controller circuitry coupled to the memory circuitry. The controller circuitry is operative to discard certain ones of the data blocks received at the input ports in an oversubscription condition in which the received data blocks exceed a designated capacity of the processor. A discarded data block indicator is generated for a given one of the input ports if a data block received at the given input port for a particular PDU is discarded. One or more additional data blocks received at the given input port for the particular PDU are discarded based at least in part on the discarded data block indicator.

In an illustrative embodiment, the controller circuitry sets the discarded data block indicator for the given input port to a first value when a first data block of the particular PDU is discarded, and automatically discards any remaining data blocks of the particular PDU that are received at the given input port while the discarded data block indicator is set to the first value. After a final data block of the particular PDU is received at the given input port while the discarded data block indicator for the given input port is set to the first value, the controller circuitry enqueues the particular PDU in a PDU buffer. The particular PDU is preferably enqueued with an associated error flag set, such that the processor can initiate a clean-up operation for the PDU based at least in part on the associated error flag.

The discarded data block indicator for the given input port may comprise a single bit. The single bit being at a first logic level indicates that at least one data block received at the given input port has been discarded for a corresponding PDU, and the single bit being at a second logic level indicates that no data block received at the given input port has yet been discarded for the corresponding PDU.

The controller circuitry is preferably operative to maintain a separate discarded data block indicator for each of the plurality of input ports, with a given one of the discarded data block indicators indicating whether or not at least one data block received at the corresponding input port has been discarded.

The processor may be configured as a network processor integrated circuit to provide an interface between a network and a switch fabric in a router or switch.

Advantageously, the techniques of the invention in the illustrative embodiment respond to an oversubscription condition using an approach which ensures that the minimum number of PDUs are corrupted via discarded data blocks. As a result, processor performance and throughput are considerably improved.

DETAILED DESCRIPTION OF THE INVENTION

The invention will be illustrated herein in conjunction with an exemplary information processing system which includes a network processor configured in a particular manner. It should be understood, however, that the invention is more generally applicable to any processor in which it is desirable to provide more efficient processing of received PDU data blocks, in the presence of an oversubscription condition, than would otherwise be possible using the conventional techniques described above.

A "processor" as the term is used herein may be implemented, by way of example and without limitation, utilizing a microprocessor, central processing unit (CPU), digital signal processor (DSP), application-specific integrated circuit (ASIC), or other type of data processing device, as well as portions or combinations of these and other devices.

The term "controller circuitry" as used herein is intended to include any portion of a processor or other type of logic or processing circuitry which is capable of performing or otherwise controlling at least a portion of an input data block discard mechanism.

The term "memory circuitry" as used herein is intended to include a separate stand-alone memory as well as a particular portion of a larger memory, and may refer to internal memory, external memory or combinations thereof.

The terms "protocol data unit" and "PDU" as used herein are intended to include a packet, or other identifiable grouping of information.

The term "data block" refers to a portion of a PDU.

The present invention in an illustrative embodiment is configured such that a network processor includes controller circuitry configurable to implement an input data block discard mechanism which minimizes the number of PDUs corrupted by discarded data blocks in an oversubscription condition.

Figure 1:
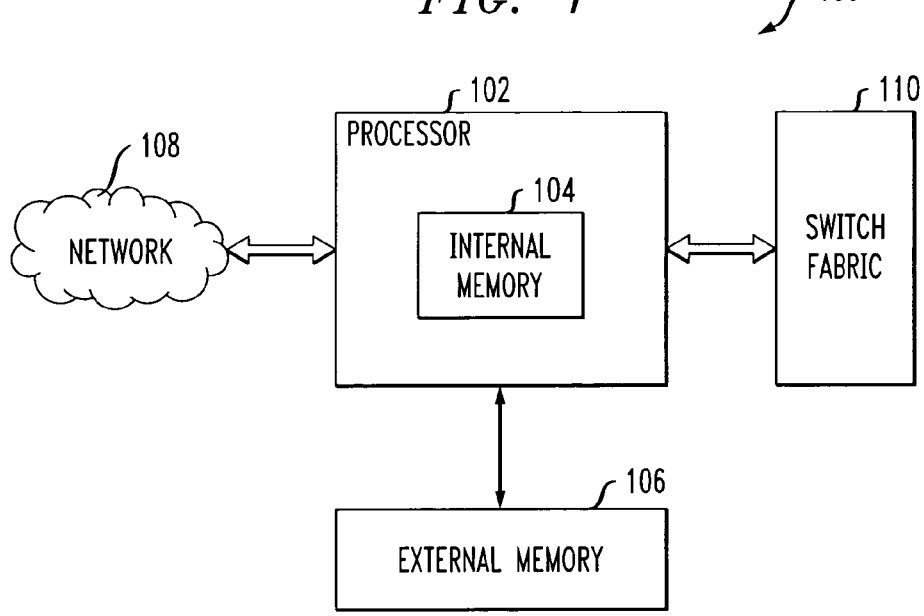
FIG. 1 is a simplified block diagram of an information processing system in which the present invention is implemented.

FIG. 1 shows an information processing system 100 in which the invention is implemented. The system 100 includes a network processor 102 having an internal memory 104. The network processor 102 is coupled to an external memory 106 as shown, and is configured to provide an interface between a network 108 from which PDUs are received and a switch fabric 110 which controls switching of PDU data. The processor 102 and its associated external memory 106 may be implemented, e.g., as one or more integrated circuits installed on a line card or port card of a router or switch. In such a configuration, the switch fabric 110 is generally considered to be a part of the router or switch.

One or both of the internal and external memories 104, 106 may be utilized to implement otherwise conventional network processor memory elements such as PDU buffer memory, queuing and dispatch buffer memory, etc.

Figure 2:
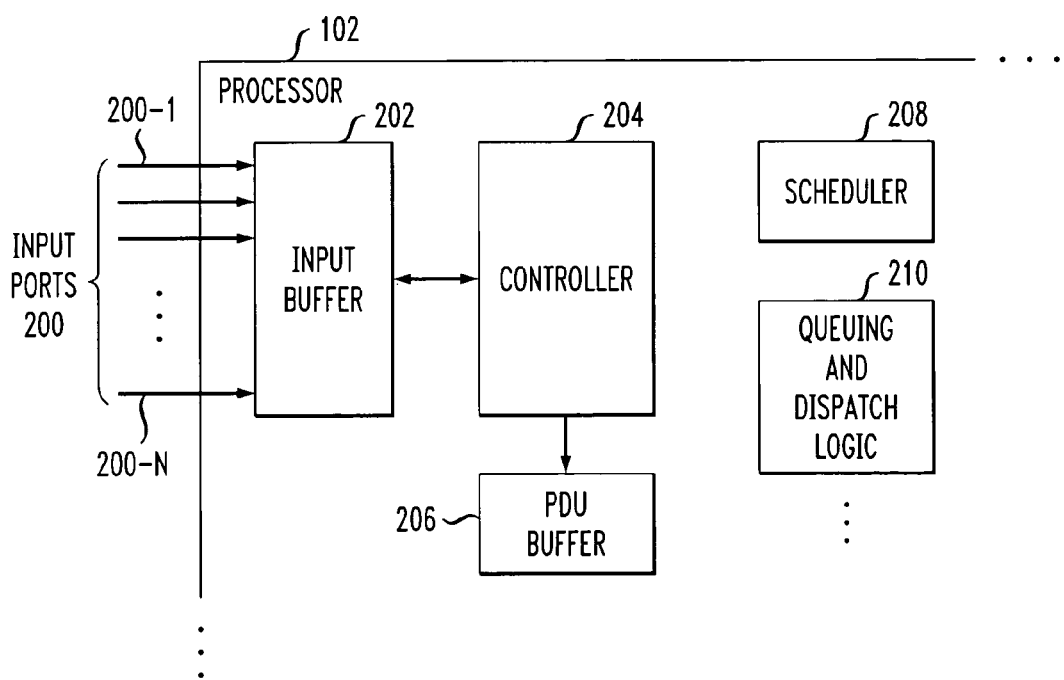
FIG. 2 is a more detailed view of a portion of the network processor of the FIG. 1 system as configured to include an input data block discard mechanism in accordance with the techniques of the invention.

FIG. 2 shows a portion of the network processor 102 in greater detail. As shown, the network processor 102 includes a set 200 of N input ports denoted 200-1, . . . 200-N. The input ports 200 may represent physical input ports of the processor, logical input ports of the processor, or any other type of input ports suitable for receiving data blocks associated with PDUs, as well as combinations of such input ports. For example, at least one of the input ports 200 may comprise a physical input port of the processor, while at least one of the input ports 200 may comprise a logical input port of the processor. The particular number N of input ports is purely arbitrary, and may take on any desired value supported by a given processor implementation.

Data blocks of PDUs received by the processor 102 at the input ports 200 are stored in input buffer 202, under the control of a controller 204, before the corresponding PDUs are enqueued in a PDU buffer 206. The input buffer 202 and PDU buffer 206 in this embodiment represent different portions of the internal memory 104 of the processor, although in other embodiments one or both of these memory elements may be implemented at least in part using external memory 106.

The network processor 102 further includes a scheduler 208, queuing and dispatch logic 210, and may also include other processing elements of a type commonly found in conventional network processors. Such elements may be considered to fall within the term "controller circuitry" as generally defined herein.

In operation, the network processor 102 stores received data blocks in the input buffer 202 before the corresponding PDUs are enqueued in the PDU buffer 206. An oversubscription condition may arise in which the received data blocks exceed a designated capacity of the processor. For example, the number of received data blocks may exceed the storage capacity allocated for such blocks in the input buffer 202, or may exceed another designated processing capability of the processor, such as a maximum number of blocks that can be handled in a given time period or a specified maximum processing bandwidth. The present invention is not restricted in terms of the particular manner in which an oversubscription condition arises, or the circumstances giving rise to an oversubscription condition.

The controller 204 in the illustrative embodiment is an example of controller circuitry operative to discard certain ones of the data blocks received at the input ports in the presence of the oversubscription condition. In accordance with the invention, the controller is configured to generate discarded data block indicators for one or more of the input ports 200. Preferably, the controller is operative to maintain a separate discarded data block indicator for each of the plurality of input ports, with each of the discarded data block indicators indicating whether or not at least one data block received at the corresponding input port has been discarded.

A discarded data block indicator is generated for a given one of the input ports if a data block received at the given input port for a particular PDU is discarded. Then, any additional data blocks received at the given input port for the particular PDU are discarded based at least in part on the discarded data block indicator. Since the discarding of a single data block will serve to corrupt the corresponding PDU, the network processor 102 utilizes the discarded data block indicator to identify the particular PDU for which additional data blocks will be discarded should the need arise in conjunction with the oversubscription condition. This advantageously eliminates the need for random discarding of data blocks and thereby substantially reduces the number of PDUs for which data blocks are discarded. The invention in the illustrative embodiment thus ensures that the minimum number of PDUs are corrupted via discarded data blocks. As a result, processor performance and throughput are considerably improved.

The term "discard" as used herein in the context of a data block is intended to include, by way of example and without limitation, any arrangement whereby the data block is dropped, overwritten, erased, marked or otherwise handled such that the data block may not necessarily be processed through the network processor in conjunction with its associated PDU in the normal manner. The invention does not require the use of any particular discarding technique for discarding data blocks.

With reference again to the previously-described example in which a processor is designed to accommodate at most the simultaneous reception of four 100-block PDUs over a set of five input ports, it was noted that conventional random discarding of data blocks in an oversubscription condition in which five 100-block PDUs are received simultaneously was likely to result in each of the five received PDUs discarding at least one data block and thus being considered corrupted. The techniques of the invention overcome this problem of excessive corruption of PDUs in an oversubscription condition. More specifically, in the simple example, once a data block is discarded for a given one of the PDUs, any additional data blocks which need to be discarded to address the oversubscription condition are discarded from that same PDU. As a result, only a single one of the five PDUs is considered corrupted, while the remaining four PDUs are able to enter the processor intact. The network processor thus overcomes the oversubscription condition in this simple example by discarding only data blocks received at one of the input ports, and associated with a particular PDU.

The controller 204 may be configured so as to set the discarded data block indicator for a given input port to a first value when a first data block of the particular PDU is discarded, and to automatically discard any remaining data blocks of the particular PDU that are received at the given input port while the discarded data block indicator is set to the first value.

After a final data block of the particular PDU is received at the given input port while the discarded data block indicator for the given input port is set to the first value, the controller 204 enqueues the particular PDU in the PDU buffer 206. The PDU is preferably enqueued with an associated error flag set, or with some other indication that the PDU has been corrupted through the discarding of one or more data blocks. The network processor can then initiate a clean-up operation for the PDU based at least in part on the associated error flag. Such a clean-up operation can be carried out in an entirely conventional manner, using techniques known in the art.

The discarded data block indicator may be a single-bit indicator or a multi-bit indicator, or may take on any other form suitable for conveying the desired information. As a more particular example, to be described in greater detail in conjunction with the flow diagram of FIG. 3, the discarded data block indicator for a given input port may comprise a single bit, referred to herein as a state bit. The controller 204 preferably maintains such a state bit for each of the input ports 200. For the given input port, the single state bit being at a first logic level, such as set to a logic '1' value, indicates that at least one data block received at the given input port has been discarded for a corresponding PDU. Similarly, the single state bit being at a second logic level, such as reset to a logic '0' value, indicates that no data block received at the given input port has yet been discarded for the corresponding PDU.

The controller 204 controls the setting and resetting of the state bits based on the received and discarded data blocks. Once a PDU is enqueued in the PDU buffer, whether corrupted or uncorrupted, the controller 204 resets the state bit maintained for the corresponding input port, such that the process can be repeated as necessary for other arriving PDUs in a manner which in effect minimizes or otherwise substantially reduces the number of PDUs which discard data blocks.

The network processor 102 may also be configured to count the number of PDUs for which data blocks are discarded based on a set state bit.

The above-described techniques are particularly well-suited for use with received PDUs that are associated with frame-based data such as that associated with Ethernet data traffic, packet-over-SONET (POS) data traffic, etc. The techniques can also be used for numerous other types of data and data formats. It should be noted, however, that the technique in the illustrative embodiment is generally not applicable to an arrangement in which multiple PDUs are interleaved on a given logical input port of a network processor.

It is to be appreciated that the network processor 102 as shown in FIG. 2 is considerably simplified for purposes of illustration, and in a given embodiment may include additional circuitry, such as one or more memory controllers, as well as appropriate interface circuitry for interfacing with the network 108, the switch fabric 110, and other external devices, such as an associated host processor or other device which communicates with the network processor 102 over a standard bus architecture, e.g., a peripheral component interconnect (PCI) bus.

The network processor 102 may also be configured so as to incorporate a packet data flushing feature as described in U.S. patent application Ser. No. 10/029,704, filed Dec. 21, 2001 and entitled "Processor with Packet Data Flushing Feature," which is commonly assigned herewith and incorporated by reference herein.

An input discard mechanism in accordance with the invention may be implemented at least in part in the form of software program code. For example, the controller 204 may be implemented at least in part utilizing elements that are programmable via instructions or other software that may be supplied to the network processor 102 using conventional arrangements, such as the above-noted host processor.

Figure 3:
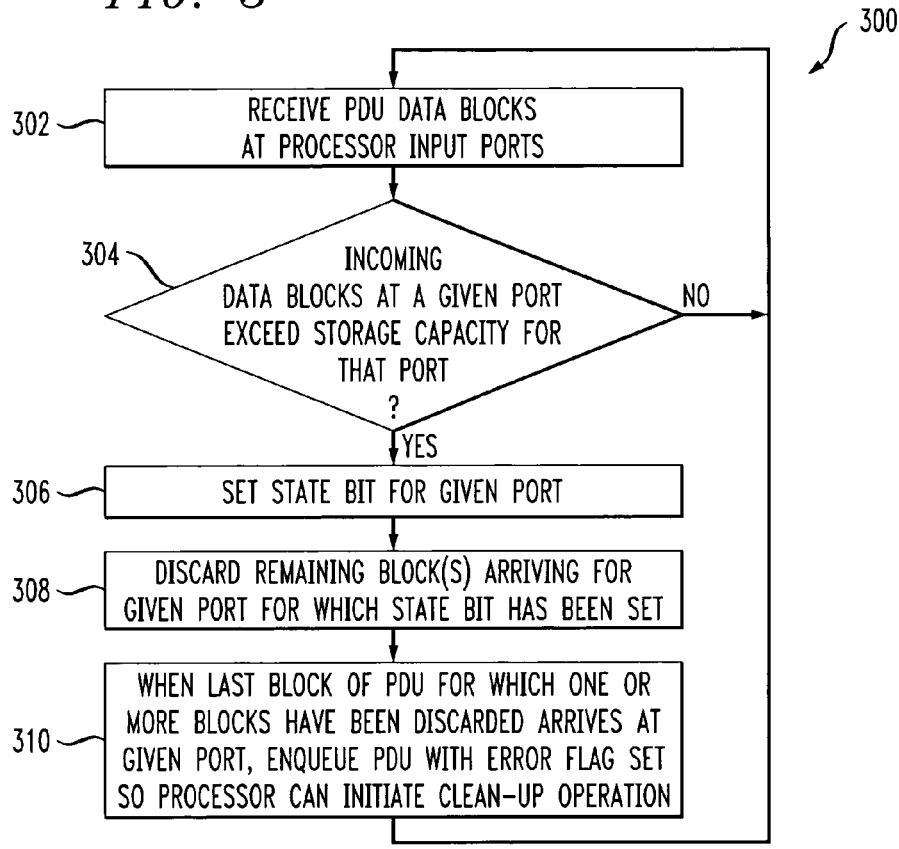
FIG. 3 is a flow diagram illustrating the operation of an example input data block discard mechanism that is implementable in the FIG. 1 system by the FIG. 2 network processor in accordance with the invention.

FIG. 3 is a flow diagram 300 which illustrates an example input data block discard mechanism implemented in the network processor 102 in accordance with the invention.

In step 302, PDU data blocks are received at the processor input ports 200.

In step 304, a determination is made as to whether or not an oversubscription condition exists. For this example, it is assumed that an oversubscription condition exists if the incoming data blocks at a given input port exceed the input buffer storage capacity for that port. As noted above, the invention does not require this or any other particular type of oversubscription condition.

If the oversubscription condition is not present, the process returns to step 302 to receive additional data blocks. If the oversubscription condition is present, a state bit is set for the given input port as indicated in step 306. The controller 204 sets this state bit, and similarly maintains state bits for each of the other input ports. In this example, it is assumed without limitation that the state bits for each of the other input ports have been previously reset and thus remain reset when the state bit is set for the given input port. The given input port thus represents the first input port in the set of input ports for which a data block has been discarded.

The process in step 308 discards the remaining data block(s) of the corresponding PDU as such data blocks arrive at the given input port for which the state bit has been set. This discarding of data blocks for a designated PDU alleviates the oversubscription condition while minimizing the number of PDUs which are corrupted through discarded data blocks.

As indicated in step 310, when a last data block of the PDU for which one or more data blocks have been discarded arrives at the given input port, the PDU is enqueued in the PDU buffer 206 with an error flag set. The processor uses the error flag to initiate a clean-up operation, as was described previously herein. The last data block of the PDU is also preferably discarded in this example, but need not be discarded. The process then returns to step 302 to process additional received data blocks.

Although this example illustrates the use of the state bits to discard data blocks from a single PDU, other implementations of the invention may require that data blocks be discarded from more than a single PDU in overcoming a given oversubscription condition. The state bits or other discarded data block indicators in accordance with the invention are utilizable in such a situation to ensure that the minimum number of PDUs are corrupted through discarded data blocks, consistent with the need to overcome the oversubscription condition.

Steps 304, 306, 308 and 310 are generally performed in the illustrative embodiment by the controller 204, but may alternatively be performed by other arrangements of controller circuitry in a network processor, as will be appreciated by those skilled in the art.

The particular steps shown in FIG. 3 should be considered as examples of PDU processing operations in accordance with the illustrative embodiment of FIGS. 1 and 2, rather than as limiting the scope of the invention in any way.

Figure 4:
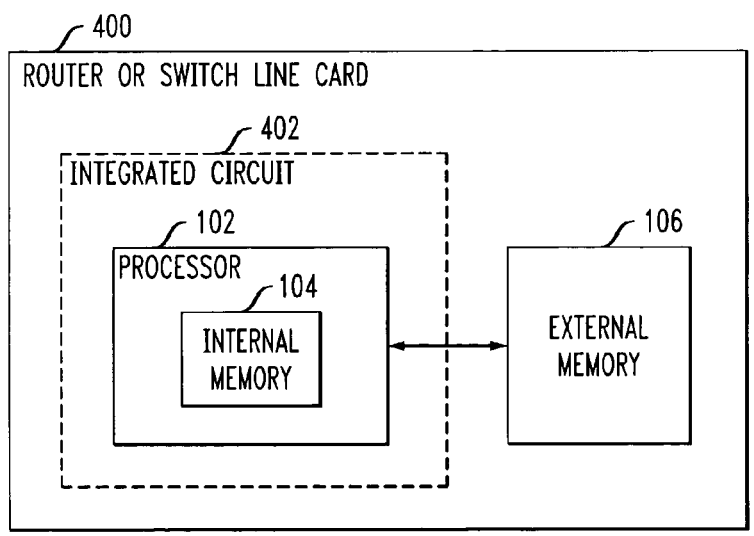
FIG. 4 illustrates one possible implementation of a network processor of the FIG. 1 system as an integrated circuit installed on a line card of a router or switch.

FIG. 4 illustrates an example router or switch line card embodiment of a portion of the system 100 of FIG. 1. In this embodiment, the processing system comprises a line card 400 having at least one integrated circuit 402 installed thereon. The integrated circuit 402 comprises network processor 102 which has internal memory 104. The network processor 102 interacts with external memory 106 on the line card 400. The external memory 106 may serve, e.g., as an external tree memory for the network processor integrated circuit. The above-noted host processor may also be installed on the line card 400. The portion of the processing system as shown in FIG. 4 is considerably simplified for clarity of illustration. It is to be appreciated, however, that the processing system may comprise a router or switch which includes multiple such line cards, and that each of the line cards may include multiple integrated circuits. A similar embodiment may be implemented in the form of a port card in a router or switch.

It should be understood that the particular arrangements of elements shown in FIGS. 1, 2 and 4 are by way of illustrative example only. More particularly, as previously noted, the invention can be implemented in any type of processor, and is not limited to any particular PDU processing application. Also, the system 100 and network processor 102 may include other elements in addition to or in place of those specifically shown, including one or more elements of a type commonly found in a conventional implementation of such a system and network processor. For example, the network processor may include conventional elements not explicitly shown in the figure. These and other conventional elements, being well-understood by those skilled in the art, are not described in detail herein.

The above-described embodiments of the invention are thus intended to be illustrative only. For example, although the illustrative embodiment of FIG. 2 utilizes controller 204 in implementing processing operations associated with an input data block discard mechanism for received PDUs, other embodiments may utilize different types of controller circuitry for implementing such operations. In addition, other embodiments can use different types of internal or external memory circuitry configurations for implementing the described functionality. Furthermore, the particular format and configuration of the discarded data block indicators in the above embodiments is purely by way of example, and other formats and configurations may be used. These and numerous other alternative embodiments within the scope of the following claims will be readily apparent to those skilled in the art.

What is claimed is:

1. A processor comprising:
   a plurality of input ports;
   memory circuitry for storing data blocks associated with protocol data units and received by the processor at the input ports; and
   controller circuitry coupled to the memory circuitry and operative to discard certain ones of the data blocks received at the input ports in an oversubscription condition in which the received data blocks exceed a designated capacity of the processor;
   wherein a discarded data block indicator is generated for a given one of the input ports if a data block received at the given input port for a particular protocol data unit is discarded;
   wherein one or more additional data blocks received at the given input port for the particular protocol data unit are discarded based at least in part on the discarded data block indicator; and
   wherein the controller circuitry is operative to maintain separate discarded data block indicators for respective ones of the plurality of input ports.

2. The processor of claim 1 wherein the controller circuitry sets the discarded data block indicator for the given input port to a first value when a first data block of the particular protocol data unit is discarded.

3. The processor of claim 2 wherein the controller circuitry is configured to automatically discard any remaining data blocks of the particular protocol data unit that are received at the given input port while the discarded data block indicator is set to the first value.

4. The processor of claim 2 wherein after a final data block of the particular protocol data unit is received at the given input port while the discarded data block indicator for the given input port is set to the first value, the controller circuitry is operative to enqueue the particular protocol data unit in a protocol data unit buffer of the memory circuitry.

5. The processor of claim 4 wherein the particular protocol data unit is enqueued with an associated error flag set.

6. The processor of claim 5 being further operative to initiate a clean-up operation for the protocol data unit based at least in part on the associated error flag.

7. The processor of claim 1 wherein the discarded data block indicator for the given input port comprises a single bit.

8. The processor of claim 7 wherein the single bit being at a first logic level indicates that at least one data block received at the given input port has been discarded for a corresponding protocol data unit, and the single bit being at a second logic level indicates that no data block received at the given input port has yet been discarded for the corresponding protocol data unit.

9. The processor of claim 1 wherein a given one of the discarded data block indicators indicates whether or not at least one data block received at the corresponding input port has been discarded.

10. The processor of claim 1 wherein the oversubscription condition is overcome by discarding only data blocks received at the given input port, and associated with the particular protocol data unit.

11. The processor of claim 1 wherein the received protocol data units are associated with frame-based data.

12. The processor of claim 1 wherein at least one of the input ports comprises a physical input port of the processor.

13. The processor of claim 1 wherein at least one of the input ports comprises a logical input port of the processor.

14. The processor of claim 1 wherein the protocol data unit comprises a packet.

15. The processor of claim 1 wherein the processor is configured to provide an interface for communication of the received protocol data units between a network and a switch fabric.

16. The processor of claim 1 wherein the processor comprises a network processor.

17. The processor of claim 1 wherein the processor is configured as an integrated circuit.

18. A method for use in a processor comprising a plurality of input ports for receiving data blocks associated with protocol data units, the method comprising the steps of:

discarding certain ones of the data blocks received at the input ports in an oversubscription condition in which the received data blocks exceed a designated capacity of the processor; and generating a discarded data block indicator for a given one of the input ports if a data block received at the given input port for a particular protocol data unit is discarded;

wherein one or more additional data blocks received at the given input port for the particular protocol data unit are discarded based at least in part on the discarded data block indicator; and wherein separate discarded data block indicators are maintained for respective ones of the plurality of input ports.

19. An article of manufacture comprising a machine-readable storage medium having program code stored thereon for use in a processor comprising a plurality of input ports for receiving data blocks associated with protocol data units, the program code when executed in the processor implementing the steps of:

discarding certain ones of the data blocks received at the input ports in an oversubscription condition in which the received data blocks exceed a designated capacity of the processor; and generating a discarded data block indicator for a given one of the input ports if a data block received at the given input port for a particular protocol data unit is discarded;

wherein one or more additional data blocks received at the given input port for the particular protocol data unit are discarded based at least in part on the discarded data block indicator; and wherein separate discarded data block indicators are maintained for respective ones of the plurality of input ports.

* * * * *